(12) United States Patent
Gordon

(10) Patent No.: US 6,637,729 B2
(45) Date of Patent: Oct. 28, 2003

(54) CONTROL FOR EVAPORATIVE COOLING APPARATUS

(76) Inventor: Larry R. Gordon, 19631 E. Camina Plata, Queen Creek, AZ (US) 85242

( * ) Notice: Subject to any disclaimer, the term of this patent is extended or adjusted under 35 U.S.C. 154(b) by 92 days.

(21) Appl. No.: 09/997,517

(22) Filed: Nov. 29, 2001

(65) Prior Publication Data

US 2003/0102578 A1 Jun. 5, 2003

(51) Int. Cl.⁷ .................................................. B01F 3/04
(52) U.S. Cl. ............................ 261/26; 261/28; 261/30; 261/89; 261/DIG. 43
(58) Field of Search .............................. 261/26, 28, 84, 261/89, 130, 30, DIG. 3, DIG. 43

(56) References Cited

U.S. PATENT DOCUMENTS

| | | | |
|---|---|---|---|
| 3,319,946 A | * | 5/1967 | Fulton, Jr. |
| 4,443,387 A | * | 4/1984 | Gordon |
| 4,609,346 A | * | 9/1986 | Siccardi |
| 4,693,852 A | * | 9/1987 | Gordon |
| 4,986,469 A | * | 1/1991 | Sutton, Jr. |
| 5,492,082 A | * | 2/1996 | Krevinghaus et al. |
| 6,070,860 A | * | 6/2000 | Kinney, Jr. et al. |
| 2002/0112673 A1 | * | 8/2002 | Lorton et al. |
| 2003/0064677 A1 | * | 4/2003 | Terrell et al. |
| 2003/0064678 A1 | * | 4/2003 | Terrell et al. |

* cited by examiner

Primary Examiner—C. Scott Bushey
(74) Attorney, Agent, or Firm—Tod R. Nissle, P.C.

(57) ABSTRACT

Evaporative cooling apparatus monitors light and heavy temperature averages to minimize cycling of the apparatus on-and-off when the apparatus is being turned on in the morning when the ambient temperature is rising and is being turned off in the afternoon when the ambient temperature is falling. The apparatus is suspended above the ground and includes a hollow housing with a top portion and a bottom portion, a fan mounted in the top portion of the housing to direct air flow through the housing downwardly toward the ground, and nozzles mounted inside the housing to direct water droplets into air flowing from the fan through the housing. The apparatus also includes a hollow, tapered member which captures a portion of the air flow from the fan and directs the airflow into a central area of the housing to insure that air flowing through the central area moves downwardly toward the ground.

4 Claims, 5 Drawing Sheets

CONTROL FOR EVAPORATIVE COOLING APPARATUS

This invention pertains to apparatus for controlling the activation and deactivation of equipment for cooling air.

In a further respect, the invention pertains to apparatus for preventing the cycling on and off of air conditioning apparatus set to be activated at a selected temperature.

In another respect, the invention pertains to apparatus of the type described which determines when to activate air conditioning equipment by comparing short term and long term ambient air temperatures.

In still a further respect, the invention pertains to apparatus of the type described which reduces the power consumption require to operate the equipment.

The utilization of compressor-driven and evaporative-cooler driven air conditioning equipment is well known in the art. One kind of evaporative cooler equipment is set forth in U.S. Pat. Nos. 4,443,387 and 4,693,852. These patents describe evaporative cooler equipment for maintaining a relatively constant ambient air temperature around dairy cows. The evaporative cooling equipment includes a plurality of spray nozzles and a fan which directs an air flow with water mist emitted from the nozzles toward the cows. The equipment also includes a control unit which activates the equipment when the ambient air temperature reaches a selected control temperature in the morning (or other time of day) and which deactivates the equipment when the ambient air temperatures falls to an associated control temperature in the afternoon (or other time of day).

While such evaporative cooling equipment has long been successfully used to maintain a selected ambient temperature around cows, one long standing "cycling" problem associated with the equipment occurs when the equipment is activated in the morning and deactivated in the afternoon and evening. The equipment is activated in the morning and deactivated in the evening because the night time ambient air temperatures are low enough that evaporative cooling is not required. The cycling problem consists of the tendency of the equipment to "hunt" or "search" for the appropriate selected control temperature due to small variations in ambient air temperature when the equipment is turned on or off. For example, if the evaporative cooling equipment is set to be activated at a selected "turn-on" control temperature of 80° F., the controller turns on the equipment when sensors monitored by the controller sense a temperature of 80° F. If, however, the sensors within a few minutes then sense a temperature of 76° F. (or less) then the controller turns off the equipment (assuming that the equipment is set with a hysteresis of 3 degrees F or less).

As soon as the sensors again detect an ambient air temperature of 80° F., the controller again turns on the equipment. Ambient air temperatures can vary due to changes in the humidity, to breezes, to clouds moving over the sun, etc. Another reason is that as soon as the fans turn on, there is typically a drop in air temperature due to the increased air circulation and movement. This cycling on and off can occur even if the controller is programmed with a few degrees of hysteresis.

It is particularly important to keep the equipment operational for as long as necessary prior to turning the equipment off in the afternoon. If the selected turn-off control temperature is 76° F., then when the temperature when taken each minute goes 76°-75°-76°-75°-76°-76°-76°-76°-77°-77°-76°-77°-76°-76°-77°-76°-75°-75°-76°-75°-75°-75°-75°-74° F., it is desirable to not have the simply because a temperature of 75° or 76° F. is sensed.

Another problem associated with prior art evaporative cooling apparatus of the type described is that such apparatus initially utilized a one-half horsepower motor to power the fan. Customers often now demand a five horsepower or larger motor. Consequently, the cost of electricity has become an issue.

Accordingly, it would be highly desirable to provide improved evaporative cooling apparatus which would avoid cycling when the apparatus is turned on, and avoid prolonged operation when it is time to shut down the equipment.

Therefore, it is a principal object of the invention to provide improved air conditioning apparatus.

A further object of the instant invention is to provide improved evaporative cooling apparatus which avoids or minimizes "on-off" cycling when the apparatus is being turned on or off at selected ambient air temperatures.

Another object of the invention is to provide improved evaporative cooling apparatus which reduces the cost of electricity required to power the apparatus.

These and other, further and more specific objects and advantages of the invention will be apparent to those skilled in the art from the following detailed description thereof, taken in conjunction with the drawings, in which.

Figure 1:
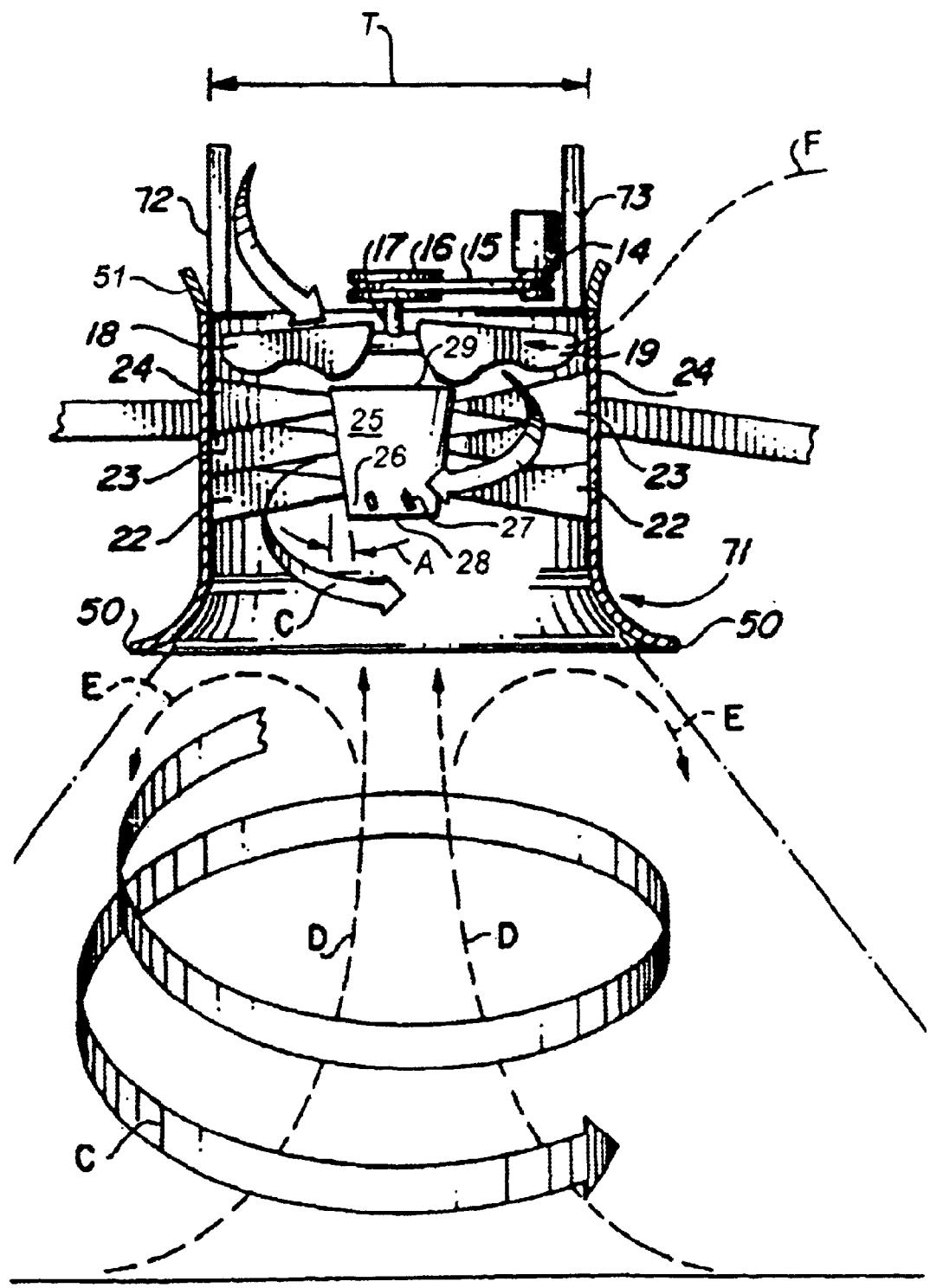
FIG. 1 is a side section view illustrating evaporative cooling apparatus constructed in accordance with the principles of the invention.

Briefly, in accordance with the invention, I provide an improved evaporative cooling apparatus. The apparatus includes at least one nozzle for emitting water droplets above the ground; a fan for directing the water droplets in a selected direction; a pressure generating system for directing water through the nozzle; and, a control unit for generating an activation signal for activating the fan and the pressure generating system to emit water droplets from the nozzle and direct the water droplets in the selected direction when the ambient air temperature reaches a selected control temperature. The control unit includes a sensor for, when the ambient air temperature is less than the selected control temperature, sensing the ambient air temperature at selected time intervals; a memory for recording the ambient air temperatures sensed at the selected time intervals by the sensor; and, an activation signal generation system. The activation signal generation system periodically repeatedly calculates at selected times of day the average ambient air temperature from the ambient air temperatures taken during a first time period to determine light temperature averages; and, a second time period to determine heavy temperature averages. The second time period is longer than the first time period. The activation signal generation system also generates the activation signal when the light temperature average is greater than the heavy temperature average, and the light temperature average reaches the selected control or "set point" temperature.

In another embodiment of the invention, I provide improved evaporative cooling apparatus. The apparatus includes a generally cylindrical hollow housing having an inner diameter greater than thirty inches; at least one nozzle mounted in the housing for emitting water droplets above the ground; a fan mounted in the housing and having a horsepower greater than two horsepower for directing the air and water droplets in a selected direction; a pressure generating unit for directing water through the nozzle; and, control means for generating an activation signal for activating the pressure generating unit and the fan to emit water droplets from the nozzle and direct the water droplets in the selected direction when the ambient air temperature reaches a selected control temperature.

Turning now to the drawings, which depict the presently preferred embodiments of the invention for the purpose of illustrating the practice thereof and not by way of limitation of the scope of the invention, the apparatus of FIG. 1 includes hollow cylindrical housing 71 attached to frame members 72 and 73. Motor 14 attached to frame member 73 rotates belt 15 to turn pulley 16. Shaft 17 carries fan blades 18, 19 which rotate simultaneously with pulley 16. Shaft 17 is rotatably supported by a frame member (not shown) connected to member 73. Inverted hollow conical member 25 is supported inside housing 71 by tiers 22, 23, 24 of radially extending members. Nozzles 27 are mounted on member 22 and extend inwardly and outwardly from member 25. Conduits (not shown) deliver water to nozzles 27, typically at a pressure in the range of 150 to 400 psi. Each nozzle typically produces droplets in the range of forty to one hundred micron droplets at a pressure of 300 psi. The droplet size can, however, vary as desired.

Fan blades 18 and 19 draw in air in the direction of arrow F and produce a downwardly directed flow of air which comes off the blades at an angle which is generally in the range of about 20 degrees to 60 degrees to the vertical. Arrows C indicate the downward expanding spiral path generally followed by air which is directed between housing 71 and member 25. Fan blades 18 and 19 also direct air into circular opening 29 of member 25, through member 25, and out the circular opening 28 of member 25. Since the cross-sectional area of member 25 decreases as the distance away from blades 18 and 19 increases, member 25 can function like a venturi so that the velocity of air exiting member 25 through opening 28 is greater than the velocity of air entering member 25 through opening 29. Even if the air velocity is not increased, tapered member 25 tends to insure that air flows outwardly through the bottom opening 28 toward the ground. When fan blades 18 and 19 begin to turn, an updraft indicated by arrows D and E can tend to result. Air exiting member 25 downwardly through circular opening 28 tends to interdict and prevent the flow of air in the direction of arrows D.

The angle or slope of the conical side 26 of hollow member 25 in FIG. 1 with respect to the vertical is indicated by arrows A. This slope is preferably in the range of five degrees to thirty degrees, preferably in the range of ten degrees to twenty degrees. If the slope is too great, then the diameter of opening 28 becomes to small and impedes the flow of air through opening 28. If the slope is too small, then the diameter of opening 28 becomes too large, and it is less likely that air will continually flow out through opening 28 toward the ground.

The conical shape of hollow member 25 is important in the practice of the invention because it helps to insure that air will continually flow downwardly from fan blades 18, 19 toward the ground and will not be drawn upwardly away from the ground in the direction of arrows D into housing 71. This is accomplished by insuring that the top of conical member 25 is wide enough to capture some of the downward flow of air produced by the inner end portions of blades 18, 19. The inner end portions of blades 18, 19 are those portions of blades 18, 19 that are closest to shaft 17. When the lower end of member 25 has a smaller cross sectional area than the upper end of member 25, air which travels downwardly from the inner end portions of blades 18, 19 through hollow member 25 tends to be accelerated because of the venturi effect produced. The acceleration of air through the lower end of member 25 helps to stabilize the flow of air through the central portion of housing 71 where the air flow is normally slower, less stable, and more susceptible to being disturbed and reversed by forces tending to draw air upwardly away from the ground and into housing 71. The diameter of the upper end of member 25 is typically great enough to cause air flowing off the inner five percent to twenty percent of the length of each blade 18, 19 to flow into and through member 25.

In use, the apparatus of FIG. 1 is normally positioned such that lower lip 50 is approximately seven to ten feet, preferably eight to nine feet, above the ground. One objective in determining the height of lower lip 50 above the ground is to insure that a cow or cows standing beneath the apparatus is moist, but not so moist that water drips off the cow onto the ground. It is desirable to prevent the ground from becoming wet. Water injected into air passing through housing 11 and member 25 is, by the time the air has traveled to within approximately one foot of the ground 51, has evaporated sufficiently to remain substantially airborne.

The inner diameter, indicated by arrows T, of cylindrical housing 71 is presently about sixty-one inches, and is preferably in the range of thirty inches to one hundred inches, most preferably fifty to seventy-two inches.

Preferably, the distance between the distal ends of blades 18, 19 and the inner wall of housing 71 adjacent the distal ends of blades 18, 19 is small and is in the range of about one-eighth to one inch, preferably about one-fourth to one-half of an inch. Motor 29 presently has a horsepower in the range of about one-half to twelve horsepower, preferably two to seven and one-half horsepower. The use of a lower horsepower motor is practical because of the long length tip-to-tip of blades 18, 19. This tip-to-tip length is in the range of about thirty to one hundred inches, preferably forty to seventy-five inches, most preferably forty-eight to seventy-two inches.

The tip-to-tip length of blades 18, 19 is slightly less than the inner diameter T of housing 71 and therefore generally equals the diameter of the housing 71 in which blades 18, 19 rotate. Since the inner end of each blade 18, 19 is attached to a hub which is mounted on shaft 17, the actual length of each blade is something less than the radius of the circular area in which blades 18, 19 rotate. For example, the length of a blade 18, 19 may only be about 70% to 90% of the radius of the circular area.

The apparatus of FIG. 1 is turned on at a selected "turn-on" control temperature and is turned off at a selected "turn-off" control temperature.

The graph of FIG. 2 illustrates a selected "turn-on" control temperature of 80° F. (line 10) and a selected "turn-off" control temperature of 76° F. (line 11), along with generally bell-shaped line 12 illustrating the light or short temperature averages and generally bell-shaped line 13 illustrating heavy or long temperature averages. On the left hand side ("UP TREND") of the graph of FIG. 1, the heavy temperature averages are generally less than the light temperature averages. On the right hand side ("DOWN TREND") of the graph of FIG. 1, the light temperature averages are generally less than the light temperature averages.

While the time period utilized to determine a light temperature average can vary as desired, at any given time of day, a light temperature average is calculated utilizing one or more measurements of the ambient temperature which have been made during a preceding selected time period. The length of this time period can vary as desired, but presently is from one second to thirty minutes, preferably one to fifteen minutes. The ambient temperature can be the temperature out-of-doors or indoors, but is presently preferably the ambient out-of-doors temperature. By way of example, if the light temperature average is calculated every minute by averaging the temperature readings made at one minute intervals during the prior five minutes, the following table provides examples of the light temperature average during a fifteen minute period beginning at 7:00 in the morning.

TABLE I

Light Temperature Averages Each Calculated For Prior Five Minutes

| Time of Day | Ambient Temp. ° F. | Light Temp. Average ° F. |
|---|---|---|
| 0700 | 68 | — |
| 0701 | 68 | — |
| 0702 | 68 | — |
| 0703 | 68 | — |
| 0704 | 69 | 68.2 |
| 0705 | 69 | 68.4 |
| 0706 | 69 | 68.6 |
| 0707 | 68 | 68.6 |
| 0708 | 68 | 68.6 |
| 0709 | 69 | 68.6 |
| 0710 | 69 | 68.6 |
| 0711 | 69 | 68.6 |
| 0712 | 70 | 69.0 |
| 0713 | 71 | 69.6 |
| 0714 | 72 | 70.2 |

Another procedure for calculating the light temperature average comprises taking multiple temperature readings during each minute (i.e., taking a reading each second, every ten seconds, etc. during a sixty second period of time) and then calculating an average temperature for that minute. Consequently, an average temperature is calculated for each minute, producing an average minute temperature. Therefore, an "average minute temperature" is calculated for each minute 0700, for 0701, for 0702, etc. Since the light temperature average is determined every minute, the light temperature average corresponds to the average minute temperature.

Or, if the light temperature average is calculated every five minutes, then each time the light temperature average is calculated, the preceding five average minute temperatures are added together and divided by five to determine the light temperature average. For example, at 0705 the average minute temperatures for 0700, 0701, 0702, 0703, and 0704 are added together and divided by five to determine the light temperature average at 0705. At 0710 the average minute temperatures for 0705, 0706, 0707, 0708, and 0709 are added together and divided by five to determine the light temperature average at 0710. And so on.

What is important in the practice of the invention is that some method be selected to calculate the light temperature average during a period of time less than the period of time utilized to calculate the heavy temperature average. The period of time during which the light temperature average is calculated is typically from about one second to thirty minutes. One of the procedures noted above can be utilized, as can any other desired procedure which calculates the light temperature average during the selected period of time.

While the time period utilized to determine a heavy temperature average can vary as desired, at any given time of day, a heavy temperature average is calculated utilizing one or more measurements of the ambient temperature which have been during a selected preceding time period. This time period can vary as desired but is usually in the range of from fifteen to three hundred sixty minutes, preferably from sixty minutes to one hundred twenty minutes. The heavy temperature average always covers a greater period of time than the light temperature average. The ambient temperature can be the temperature out-of-doors or indoors, but is presently preferably the ambient out-of-doors temperature. By way of example, if the heavy temperature average is calculated by (1) taking the ambient temperature each minute during fifteen consecutive minutes comprising a "block" of time, (2) averaging the fifteen readings in the block to obtain a block average value, (3) repeating the procedure of (1) and (2) for the next consecutive seven block (where each block is fifteen minutes long and includes fifteen readings) to obtain seven more block average values, (4) averaging the eight block average values obtained during the previous two hours to obtain a first heavy temperature average. Fifteen minutes after the first heavy temperature average is obtained, a new heavy temperature average is calculated by averaging together the eight most recent block average values obtained, which recent block average values were obtained during the prior two hour period. Consequently, each fifteen minutes a new heavy average is obtained using only the eight most recent block averages.

The following Table II provides examples of the heavy temperature average calculated during a thirty minute period beginning at 7:00 in the morning. In Table II, is it assumed that at 0700 the eight previous block averages were 60, 60, 61, 62, 64, 66, 67, and 68 degrees F., for a heavy average at 0700 equal to 63.5 degrees F. Each block average is for a fifteen minute period and is obtained by adding together fifteen readings taken during the fifteen minute period. The fifteen readings are taken at one minute intervals.

TABLE II

Heavy Temperature Averages Each Calculated For Prior Thirty Minutes

| Time of Day | Ambient Temp. ° F. | Heavy Temp. ° F. |
|---|---|---|
| 0700 | 68 | 63.5 |
| 0701 | 68 | (63.5) |
| 0702 | 68 | (63.5) |
| 0703 | 68 | (63.5) |
| 0704 | 68 | (63.5) |
| 0705 | 68 | (63.5) |
| 0706 | 68 | (63.5) |
| 0707 | 68 | (63.5) |
| 0708 | 68 | (63.5) |
| 0709 | 68 | (63.5) |
| 0710 | 69 | (63.5) |
| 0711 | 69 | (63.5) |
| 0712 | 69 | (63.5) |
| 0713 | 69 | (63.5) |
| 0714 | 69 | (63.5) |
| 0715 | 70 | 64.6 |
| 0716 | 70 | (64.6) |
| 0717 | 70 | (64.6) |
| 0718 | 70 | (64.6) |
| 0719 | 70 | (64.6) |
| 0720 | 71 | (64.6) |
| 0721 | 71 | (64.6) |
| 0722 | 72 | (64.6) |
| 0723 | 72 | (64.6) |
| 0724 | 72 | (64.6) |
| 0725 | 72 | (64.6) |

TABLE II-continued

Heavy Temperature Averages Each Calculated For Prior Thirty Minutes

| Time of Day | Ambient Temp. ° F. | Heavy Temp. ° F. |
| --- | --- | --- |
| 0726 | 73 | (64.6) |
| 0727 | 74 | (64.6) |
| 0728 | 75 | (64.6) |
| 0729 | 75 | (64.6) |
| 0730 | 75 | 66.08 |

Another procedure for calculating the heavy temperature average comprises first taking multiple temperature readings during each minute (i.e., taking a reading each second, every ten seconds, etc. during a sixty second period of time) and then calculating an average temperature for that minute. Consequently, an average temperature is calculated for each minute, producing an average minute temperature. Therefore, an "average minute temperature" would be calculated for 0700, for 0701, for 0702, etc. The heavy temperature average is then calculated by calculating "blocks" of average temperature minutes for each of eight consecutive fifteen minute periods, and then averaging together the eight blocks. For example, if the heavy temperature average is to be determined over a period of time equal to one hundred and twenty minutes, the heavy temperature average is determined by adding together the average temperature for each of eight consecutive fifteen minute blocks. The average temperature for first fifteen minute block is calculated by adding together the average minute temperatures for 0700, 0701, 0702, 0703, 0704, 0705, 0706, 0707, 0708, 0709, 0710, 0711, 0712, 0713, 0714 and dividing by fifteen. The average temperature for the second fifteen minute block is calculated by adding together the average minute temperatures for 0715, 0716, 0717, 0718, 0719, 0720, 0721, 0722, 0723, 0724, 0725, 0726, 0727, 0728, and dividing by fifteen. And so on. Once the average temperature for eight consecutive fifteen minute blocks is determined for, say, the period of time extending from 0700 to 0900 (i.e., for a period of time of one hundred and twenty minutes) then at 0900 the heavy temperature average is calculated by adding together the average temperature for each of the eight immediately preceding fifteen minute blocks and dividing by eight. The eight fifteen minute blocks immediately preceding 0900 ended at 0715, 0730, 0745, 0800, 0815, 0830, 0845, and 0900. The next heavy temperature average is calculated at 0915 by using the average temperature for each of the eight fifteen minute blocks immediately preceding 0915. The eight fifteen minute blocks immediately preceding 0915 ended at 0730, 0745, 0800, 0815, 0830, 0845, 0900, and 0915. In other words, when the average heavy temperature is next calculated at 0915, the oldest block of averages (i.e., the block of averages determined for the fifteen minutes extending from 0700 to 0714 is dropped).

What is important in the practice of the invention is that some method be selected to calculate the heavy temperature average during a period of time which is longer than the period of time used to calculate the light temperature average. One of the procedures noted above can be utilized, as can any other desired procedure which calculates a heavy temperature average during the selected period of time.

Figure 2:
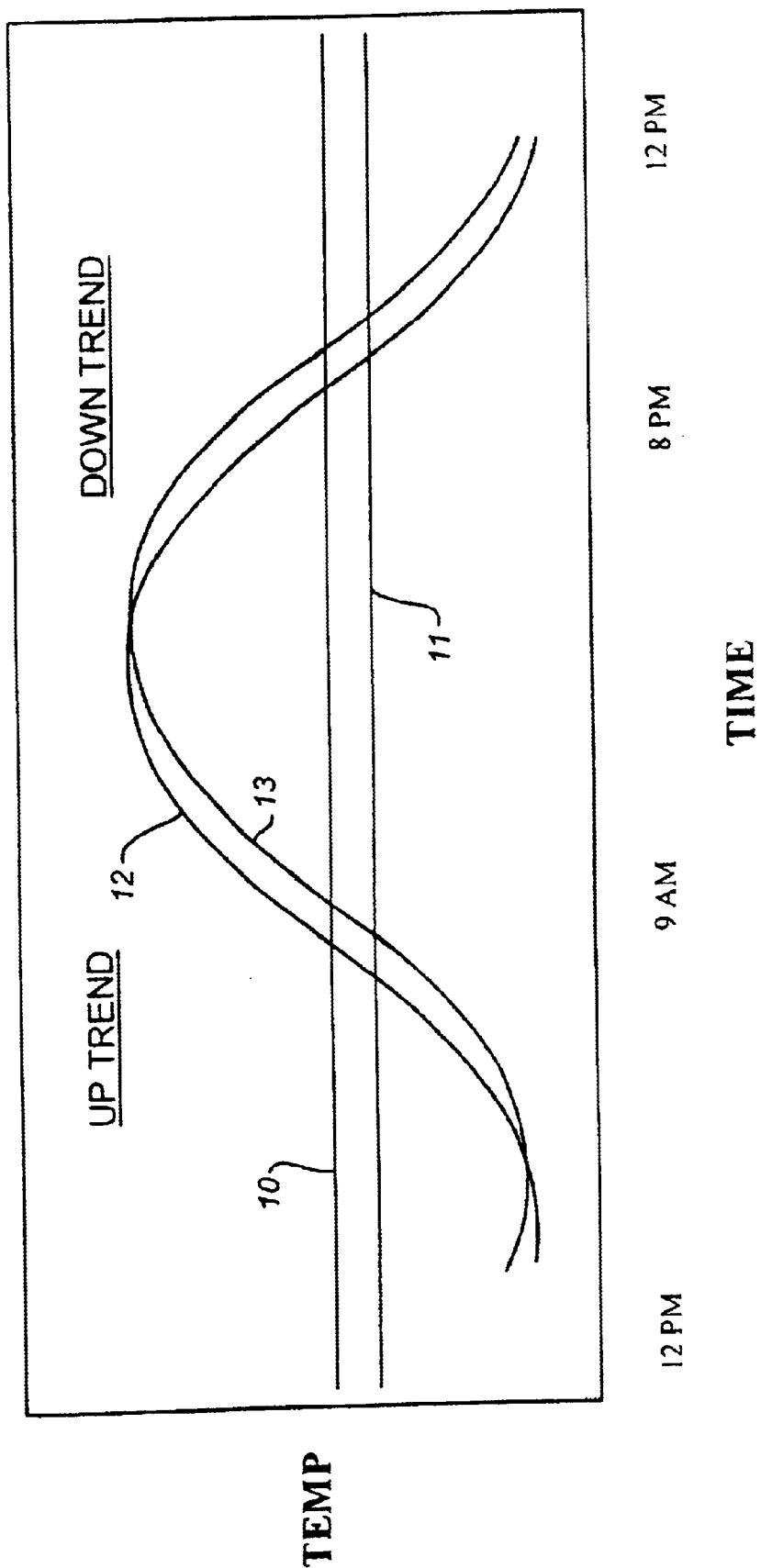
FIG. 2 is a graph illustrating light temperature averages and heavy temperature averages generated in accordance with the principles of the invention.

In the graph of FIG. 2, the distance between the light temperature average line 12 and the heavy temperature average line 13 can usually be increased by increasing, while maintaining the length of the time period utilized to calculate a light temperature average, the length of the time period utilized to calculate the heavy temperature average. Or, the distance between the light temperature average line 12 and the heavy temperature average line 13 can usually be increased by decreasing, while maintaining the length of the time period utilized to calculate a heavy temperature average, the length of the time period utilized to calculate the light temperature average.

On the left side of the graph of FIG. 2, an up trend occurs when the light temperature average is greater than the heavy temperature average. On the right side of the graph of FIG. 2, a down trend occurs when the light temperature average is less than the heavy temperature average.

Figure 3:
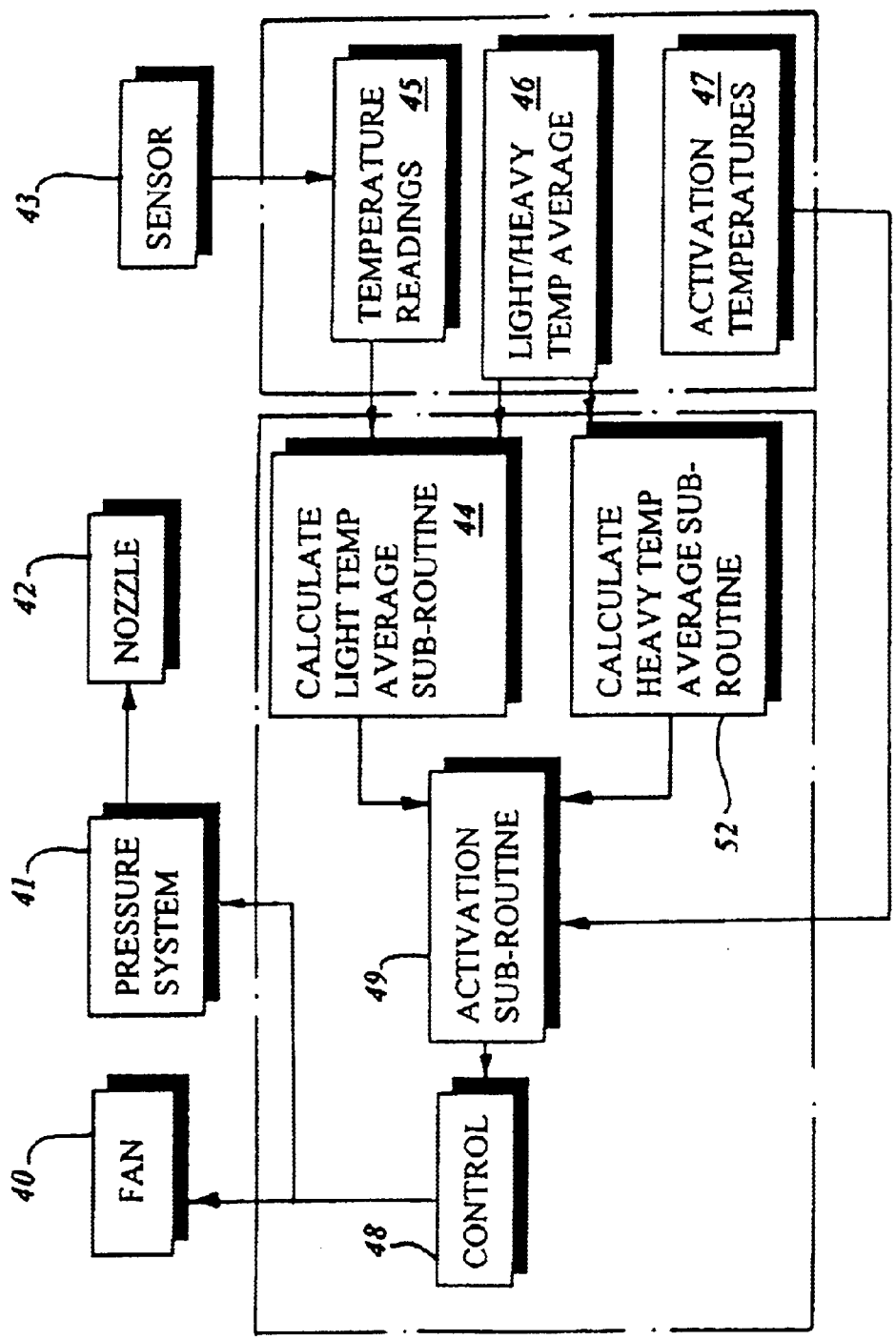
FIG. 3 is a block diagram illustrating the mode of operation of the evaporative apparatus of the invention.

The control system utilized to turn the evaporative cooling apparatus of FIG. 2 on and off is illustrated in FIG. 3 and includes a controller, memory, and temperature sensor 43.

The memory includes temperature readings 45 from sensor 43, light and heavy temperature averages 46, and the activation temperatures 47 for turning the evaporative cooling apparatus on and off.

The controller includes the calculate light temperature average sub-routine 44, calculate heavy temperature average sub-routine 50, and activation sub-routine 49.

Sensor 43 determines the ambient air temperature at selected intervals, for example, every minute, and transmits ambient air temperature data to the temperature reading 45 portion of the memory. The calculated light temperature average sub-routine 44 utilizes the temperature readings stored in temperature readings 45 to calculate light temperature averages at selected intervals—for example, every minute—to produce data like that shown in Table I above. The light temperature averages calculated by sub-routine 44 are stored in light/heavy temperatures 46 portion of the memory. The calculated heavy temperature average sub-routine 50 utilizes the temperature readings stored in temperature readings 45 to calculate heavy temperature averages at selected intervals—for example, every fifteen minutes—to produce data like that shown in Table II above. The heavy temperature averages calculated by sub-routine 50 are stored in light/heavy temperatures 46 portion of the memory. There is an up trend when the light temperature average is greater than the heavy temperature average.

The activation temperatures 47 portion of the memory includes the temperature at which the apparatus of FIGS. 1 and 3 is turned on and the temperature at which the apparatus of FIGS. 1 and 3 is turned off. The "turn on" temperature can equal the "turn off" temperature, but these two temperatures typically are different.

The "turn on" point occurs when the light temperature average equals or is greater than the selected set point (turn on) temperature and when there is an up trend. The "turn off" point occurs when the light temperature average equals or is less than the selected set point (turn off) temperature and when there is a down trend.

If the "turn on" temperature is 80° F., controller 40 turns on the fan motor 14 when there is in an up trend and the light temperature average is 80° F. or greater. The pressure system 41 is typically turned on after the fan and currently cycles through twelve stages which each increase the volume of water emitted by nozzle 27.

If desired, the heavy temperature average can be used instead of the light temperature average to turn the system on and off. For example, the "turn on" temperature occur when the heavy temperature average equals a selected set point temperature and when there is an up trend.

The "turn on" and "turn off" temperatures usually differ but may be the same.

The activation sub-routine 49 utilizes the light/heavy temperatures stored in portion 46 of the memory and utilizes the activation temperatures stored in portion 47 of the memory in order to determine when to generate a signal to control 48 so that control 48 sends commands to fan 40 and pressure system 41, respectively, to turn the fan and pressure system on or off. Activation sub-routine 49 determines that there is an up trend when, as noted above, the light temperature average is greater than the heavy temperature average.

When activation sub-routine 48 determines there is an up trend (as is the case on the left hand side of the graph of FIG. 1), it monitors the light temperature average (or the heavy temperature average, as the case may be) to determine when the light temperature average (or the heavy temperature average) is equal to or greater than the selected "turn-on" set point temperature stored in activation temperatures 47 portion of the memory. When the light temperature average calculated by the sub-routine 50 is equal to or greater than the selected "turn-on" set point temperature stored in memory portion 46, and when there is in an up trend, the activation sub-routine 49 generates an activation signal to control 48, and control 48 generates commands to fan 40 which causes fan motor 14 to turn on and the fan blades 18, 19 to produce an airflow which will carry any droplets emitted from nozzle 27 due to operation of pressure system 41 in the general direction indicated by arrows C n FIG. 1.

Similarly, when activation sub-routine 49 determines there is a down trend (as is the case on the right hand side of the graph of FIG. 2), sub-routine 49 monitors the light temperature average (or the heavy temperature average) to determine when the light temperature average (or heavy temperature average) is equal to or less than the selected "turn-off" set point temperature average stored in activation temperatures 47 portion of the memory. When the light temperature average calculated by the sub-routine 50 is equal to or less than the selected "turn-off" set point temperature average stored in memory portion 47, the activation sub-routine 49 generates an activation signal to control 48, and control generates commands to fan 40 and pressure system 41 which causes fan 40 to turn off such that fan 40 does not produce an airflow which will carry any droplets emitted from nozzle 27 in the general direction indicated by arrows C in FIG. 1.

In an uptrend, if desired, the activation sub-routine 49 (or sub-routine 50) can be programmed to subtract one or two degrees F-or more-from each light temperature average calculated by sub-routine 50 so that before control turns on fan 40 and pressure system 41 the light temperature average has to actually rise to be one or two degrees F higher than the selected "turn on" set point temperature average entered in the activation temperatures 47 portion of the memory.

Similarly, sub-routine 50 can be programmed to utilize earlier temperature readings when calculating the light temperature average. For example, in Table I, instead of at 0714 utilizing the five ambient temperature readings (listed in the second column of Table I) from 0710 to 0714 to calculate the "actual" light temperature average, the five ambient temperature readings (listed in the second column of Table I) from 0708 to 0712 can be utilized to produce a "delayed" light temperature average. The "delayed" light temperature average would be 69.0 at 0714 instead of the "actual" light temperature average of 70.2° F. noted in Table I. Fan 40 and system 41 would not be turned on until the "delayed" light temperature average equaled the "turn on" set point temperature average stored in activation temperatures 47. If, for example, the selected "turn on" set point temperature stored in activation temperatures 47 was 80° F., the practical effect of utilizing a "delayed" light temperature average would, in this example, therefore be to delay the turn-on of fan 40 and pressure system 41 until the "actual" light temperature average was about a degree greater than 80° F.

When a cold weather front or a warm weather front passes through, such a front usually causes a fairly rapid temperature change and does not cause the cycling problem often experienced by prior art evaporative cooling apparatus during turn-on in the morning and turn-off in the afternoon.

As would be appreciated by those of skill in the art, a principal used of the apparatus of FIGS. 1 and 3 is to produce evaporatively cooled air which helps maintain a relatively constant air temperature around a dairy cow. The apparatus is mounted above and directs evaporatively cooled air downwardly toward a dairy cow standing beneath the apparatus. The evaporative cooling apparatus of the invention can, however, be utilized in any other desired application.

Figure 4:
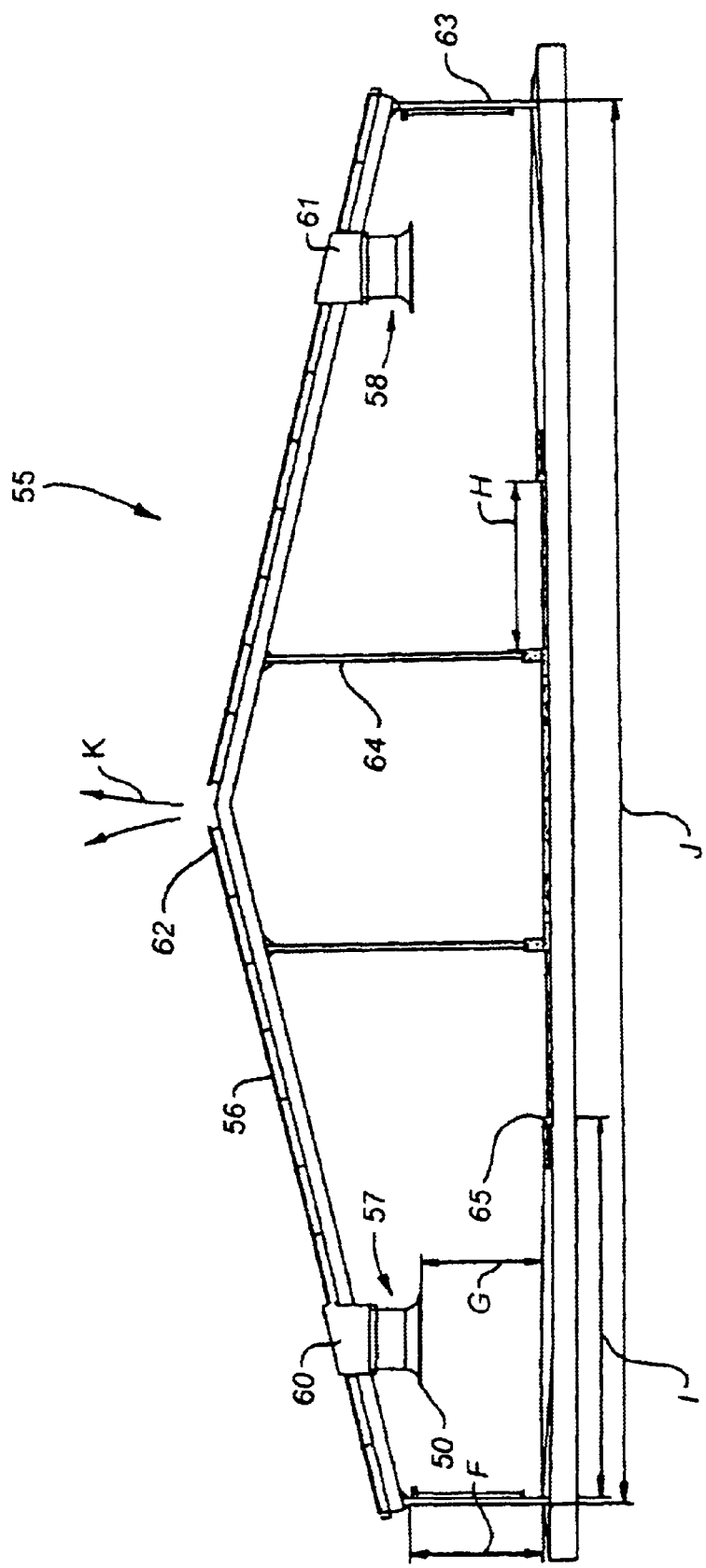
FIG. 4 is a side elevation view illustrating a cooling system constructed in accordance with an alternate embodiment of the invention.

FIG. 4 illustrates an alternate embodiment of the invention including a building 55. FIG. 4 is an end elevation view of building 55. Building 55 includes a sloped roof 56 with at least one peak 62. Warm air rises upwardly toward the peak 62 and exits in the directions indicated by arrows K through a ventilation opening or openings (not shown) positioned near or adjacent the peak 62. The slope of roof 56 ordinarily is in the range of 1.50:12 (i.e., the roof rises-or falls-1.75 inches over each twelve inch lateral horizontal span of the roof) to 4:12.

The width of building 55, indicated by arrows J, can vary as desired but usually is at least seventy feet, typically about one hundred feet or more, but less than two hundred feet. The height of the sides of building 55 indicated by arrows F, can vary as desired, but usually is at least eight feet, typically about nine feet, but less than twenty feet.

In some instances, only half of building 55 is constructed. Such a "half-building" construction includes only one-half the roof illustrated in FIG. 4, which means that the roof on a "half-building" construction has only a single slope. In contrast, the roof of building 55 has two slopes; a different slope for each half of the roof. The width of a "half-building" construction is at least thirty feet, typically about fifty feet or more, but less than one hundred feet.

Each unit 57, 58 is equivalent to the evaporative cooling unit illustrated in FIG. 1 and is suspended from and connected to roof 56 by a duct structure 60, 61, respectively. The distance of the bottom edge 50 of each unit 57, 58 above the ground or floor of building 55 is indicated by arrows G and is presently eight and a half feet. Distance G can vary as desired but is usually in the range of six to ten feet, preferably about eight and a half feet. If desired, units 57, 58 can be connected directly to roof 56 without using a duct structure 60, 61 which extends between each unit 57, 58 and roof 56.

Arrows I indicate the width or depth of a stall in building 55. This width can vary as desired but is presently about twenty-seven feet.

Arrows H indicate the distance from a stall edge 65 to a vertical support beam 64. This distance can vary as desired but presently is about twelve feet.

A problem associated with large buildings of the type 55 (or with the "half-buildings" with a single slope roof described above) shown in FIG. 4 is that air inside the building tends to stagnate. This occurs even though the building's roof is intentionally sloped to encourage warm air to rise upwardly to peak 62 and out through ventilation openings formed in roof 56. An additional problem is that the tendency of air to rise upwardly from the ground toward roof 56 can interfere with operation of evaporative cooling apparatus of the general type set forth in FIG. 1. This interference occurs because during the normal operation of apparatus of the type illustrated in FIG. 1, air spirals downwardly in the manner indicated by arrow C. This downward movement of air is, however, offset by air that rises from the floor of building 55 and travels upwardly toward peak 62. Such rising air tends to amplify the natural tendency of air to rise upwardly in the direction indicated by arrows D. Also, when breeze travels over the top of the roof 56, a pressure differential is created which tends to draw air from inside the building out through the peak 62 in the direction of arrow K. This pressure differential also tends to draw air upwardly into and through housing 71 toward roof 56 in the direction of travel indicated by arrows D in FIG. 1.

In order to offset the problems noted above in connection with large buildings 55, the apparatus of FIG. 1 is provided (1) with conical tapered member 25 that functions to increase the rate at which air exits member 25 and flows downwardly toward the ground, (2) with a fan blade having a diameter in the range of thirty to one hundred inches to increase to volume of air flowing downwardly toward the ground, (3) with an upper cylindrical cowling ring 51 which does not extend from the inside of the cylindrical housing 71 outwardly toward the ends of blades 18 and 19, but which instead extends upwardly from the upper edge of housing 71 to that the outer ends of blades 18 and 19 can be positioned closer to the inner cylindrical surface of housing 71, and (4) to increase the efficiency of operation of the fan, with fan blades 18, 19 having outer ends that are spaced apart only one-eighth to one and one-quarter inch from the inside cylindrical wall of housing 71. In addition, the lower edge or lip 50 is positioned the desired distance G above the ground by using, if necessary, a duct extension 60 to space the evaporative cooling unit of FIG. 1 a desired distance below roof 56.

Figure 5:
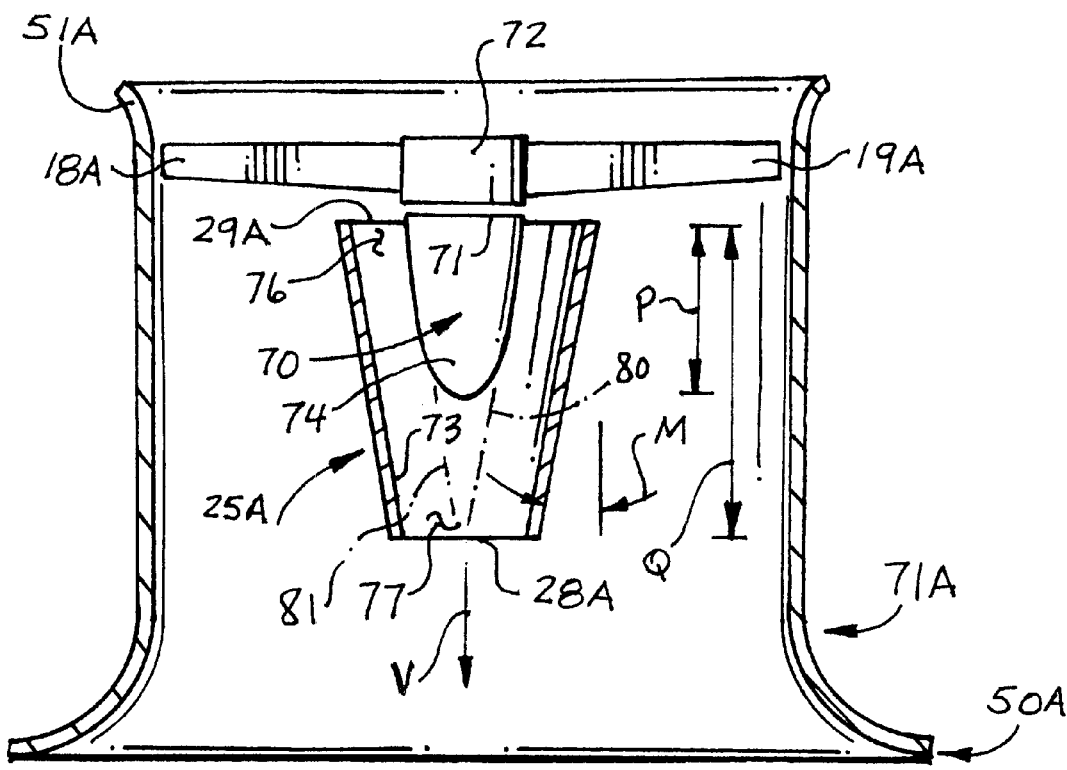
FIG. 5 is a side section elevation view illustrating an alternate embodiment of the invention; and, FIG. 6 is a top view of a portion illustrating construction details of the embodiment of the invention of FIG. 5.
Figure 6:
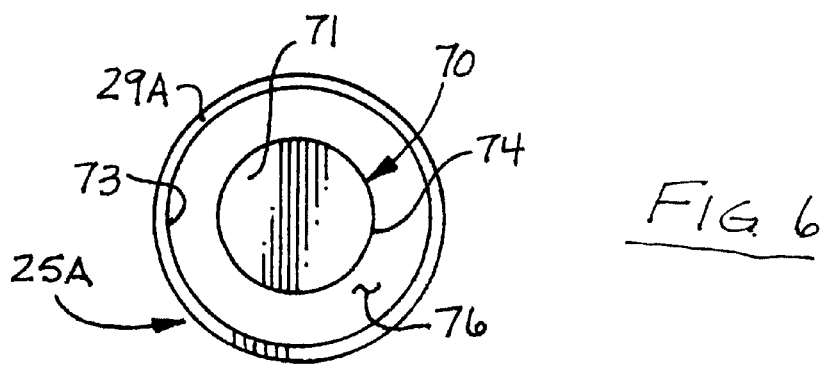

The embodiment of the invention illustrated in FIGS. 5 and 6 includes hollow cylindrical housing 71A with an upper cowling 51A and a lower cowling 50A. A fan mounted inside the upper portion of housing 71A includes hub 72 and blades 18A and 19A extending outwardly from hub 72. Hollow conical duct 25A is mounted inside housing 71A. Airflow guide 70 is mounted beneath hub 72 and is generally laterally centered in housing 71A. The structural members utilized to mount the fan, the airflow guide 70, and the hollow conical duct 25A are omitted from FIG. 5 for sake of clarity, but can be comparable to the structural members illustrated in FIG. 1 or can take on any other desired shape and dimension and arrangement.

At least a portion of the arcuate outer surface 74 of airflow guide 70 preferably, but not necessarily, tapers from top to bottom.

When the fan is operating and blades 18A, 19A are rotating, air downwardly displaced by the inner portions of blades 18A, 19A travels between guide 70 and the inner conical surface 73 toward circular opening 77 at the bottom of conical member 25A. Airflow guide 70 functions to occupy space beneath hub 72 and to channel airflow from blades 18A, 19A between guide 70 and surface 73.

At the top edge 29A of member 25A, the space between guide 70 and surface 73 is doughnut shaped. The cross-sectional area of doughnut-shaped space 76 is visible in FIG. 6. At the lower edge 28A of member 25A, the cross-sectional area 77 is circular. The ratio of the cross-sectional area of doughnut-shaped space 76 with respect to the cross-sectional area of circular space 77 is in the range of 0.75:1 to 1.9:1, preferably 1.1:1 to 1.7:1. The cross-sectional area of space 76 is preferably greater than the cross-sectional area of space 77 because member 25A then tends to function like a venturi and to increase the rate at which air from blades 18A, 19A flows downwardly through area 77. Even when, however, the ratio of the cross-sectional area of space 76 to the cross-sectional area of space 77 is in the range of 0.75:1 to 1:1, tapered member 75 tends to function to insure that air from the fan flows downwardly through area 77 toward the ground in the direction of arrow V and does not flow upwardly through area 77 into member 25A. Consequently, member 25A tends to stabilize air flow from member 25A downwardly toward the ground.

By way of example, and not limitation, when the diameter of housing 71A is fifty-two inches, the inner diameter of the circular top edge 29A is two feet, and the inner diameter of the circular bottom edge 28A is eighteen and three-fourths inches. The height Q of member 25A is eighteen inches. The height of guide 70 is twelve inches. The diameter of the top 71 of guide 70 is twelve inches. The diameter of hub 72 is twelve inches.

When the diameter of housing 71A is sixty inches, the inner diameter of the circular top edge 29A is two feet, seven inches; and, the inner diameter of the circular bottom edge 28A is twenty inches. The height Q of member 25A is eighteen inches. The height of guide 70 is twelve inches. The diameter of the top 71 of guide 70 is eighteen inches. The diameter of hub 72 is eighteen inches.

When the diameter of housing 71A is seventy-two inches, the inner diameter of the circular top edge 29A is thirty-four and one half inches; and the inner diameter of the circular bottom edge 28A is twenty-three and one-half inches. The height Q of member 25A is eighteen inches. The height of guide 70 is twelve inches. The diameter of the top 71 of guide 70 is twenty-one inches. The diameter of hub 72 is twenty-one inches.

It is preferred that air traveling downwardly through member move through a tapered doughnut shaped flow path or channel (1) between surface 73 and guide 70, and (2) between surface 73 and the central conical space represented by dashed lines 80 and 81. Guide 70 functions to fill up space on the interior of this tapered doughnut shape path to prevent air from traveling inwardly into the area occupied by guide 70. The conically shaped "dead" space represented by dashed lines 80 and 81 directly beneath guide 70 is also on the interior of the desired tapered doughnut shaped flow path and is not occupied by the guide 70 illustrated in FIG. 5. If desired, it is possible to shape guide 70 to also occupy this space so that some of the air traveling downwardly toward opening 77 can not drift into this dead space.

When the volume of the space occupied by guide 70 is added to the volume of the conically shaped dead space 80, 81 beneath guide 70 in FIG. 5 to obtain a total inner volume for the space which is interior of the desired tapered doughnut shaped flow path, it is preferred that the volume occupied by guide 70 be 60% to 95% of said total inner volume, most preferably 75% to 90% of the total inner volume. It is important that guide 70 occupy a sizeable portion of the total volume to insure that air flowing downwardly into member 25A from the fan will be channeled along the desired doughnut shaped tapering path and will not drift inwardly away from inner surface or wall 73.

Having set forth my invention and the presently preferred embodiments and uses thereof, I claim:

1. Evaporative cooling apparatus including (a) at least one nozzle for emitting water droplets above the ground;

(b) fan means to produce air flow to direct said water droplets in a selected direction;

(c) pressure means for directing water through said nozzle;

(d) control means for generating an activation signal to activate said fan means when the ambient air temperature reaches or exceeds a selected control temperature, said control means including (i) sensor means for sensing the ambient air temperature at selected time intervals, (ii) memory means for recording said ambient air temperatures sensed at said selected time intervals by said sensor means, (iii) means for periodically repeatedly calculating at selected times of day using said recorded ambient air temperatures light temperature averages during first time period having a selected length, heavy temperature averages during a second time period having a selected length greater than said first time period, generating said activation signal when an uptrend occurs and one of said light temperature average and said heavy temperature average at least equals said selected control temperature.

2. Evaporative cooling apparatus including (a) a generally cylindrical hollow housing having a diameter greater than thirty-six inches;

(b) at least one nozzle mounted in said housing for emitting water droplets above the ground;

(c) fan means mounted in said housing and having a horsepower greater than two horsepower for generating air flow;

(d) pressure means for directing water through said nozzle;

(e) control means for generating an activation signal for activating said fan means when the ambient air temperature reaches a selected control temperature.

3. Evporative cooling apparatus including (a) a generally cylindrical hollow housing;

(b) at least one nozzle mounted in said housing for emitting water droplets above the ground;

(c) fan means mounted in said housing and having a horsepower greater than two horsepower to produce a flow of air to direct said water droplets in a selected direction;

(d) pressure means for directing water through said nozzle;

(e) a tapered hollow member mounted in said housing to receive a portion of said flow of air; and, (f) control means for generating an activation signal for activating said pressure means and said fan means to produce water droplets and direct said water droplets in said selected direction when the ambient air temperature reaches a selected control temperature.

4. An evaporative cooling system including (a) a building structure having (i) a width greater than about thirty feet, (ii) a roof having a peak and a slope of at least 1.50:12, and (iii) at least one ventilation opening formed in the roof to permit air rising upwardly toward the roof to pass outwardly-through said ventilation opening and said roof;

(b) a plurality of evaporative cooling units each including (i) a generally cylindrical hollow housing having a diameter greater than forty inches, (ii) at least one nozzle mounted in said housing for emitting water droplets above the ground, (iii) fan means mounted in said housing and having a motor with a horsepower greater than two horsepower for directing said water droplets in a selected direction, (iv) pressure means for directing water through said nozzle;

(v) control means for generating an activation signal for activating said fan means when the ambient air temperature reaches a selected control temperature;

each of said cooling units being connected to the roof such that said cooling unit is spaced a selected distance above the ground.

\* \* \* \* \*